US012786168B2

(12) United States Patent
Tsirkin et al.

(10) Patent No.: US 12,786,168 B2
(45) Date of Patent: Nov. 3, 2026

(54) ZERO TRUST SUPPORT FOR SECURE NETWORKS VIA MODIFIED VIRTUAL PRIVATE NETWORK

(71) Applicant: RED HAT, INC., Raleigh, NC (US)

(72) Inventors: Michael Tsirkin, Yokneam (IL); Amnon Ilan, Ra'anana (IL)

(73) Assignee: Red Hat, Inc., Raleigh, NC (US)

( * ) Notice: Subject to any disclaimer, the term of this patent is extended or adjusted under 35 U.S.C. 154(b) by 403 days.

(21) Appl. No.: 18/176,191

(22) Filed: Feb. 28, 2023

(65) Prior Publication Data

US 2024/0291803 A1 Aug. 29, 2024

(51) Int. Cl.
*H04L 9/40* (2022.01)

(52) U.S. Cl.
CPC ........ *H04L 63/0272* (2013.01); *H04L 63/029* (2013.01); *H04L 63/0869* (2013.01)

(58) Field of Classification Search
CPC ........................ H04L 63/0272; H04L 63/029; H04L 63/0869
See application file for complete search history.

(56) References Cited

U.S. PATENT DOCUMENTS

| | | | |
|---|---|---|---|
| 9,571,457 B1 | 2/2017 | Hoy et al. | |
| 10,893,023 B2 | 1/2021 | Wang et al. | |
| 2007/0050502 A1* | 3/2007 | Barker | H04L 67/1095 709/225 |
| 2016/0344839 A1* | 11/2016 | Arthurs | H04L 12/1859 |
| 2020/0145385 A1* | 5/2020 | Chauhan | H04L 63/0281 |
| 2021/0141874 A1* | 5/2021 | Kursun | G06F 21/32 |

FOREIGN PATENT DOCUMENTS

| | | | |
|---|---|---|---|
| CN | 112997180 A * | 6/2021 | G06F 21/62 |
| WO | WO-2016163410 A1 * | 10/2016 | H04W 12/06 |

* cited by examiner

*Primary Examiner* — Fatoumata Traore
*Assistant Examiner* — Carlton Johnson
(74) *Attorney, Agent, or Firm* — Kilpatrick Townsend & Stockton LLP

(57) ABSTRACT

Zero trust support for secure networks can be provided via a modified virtual private network (VPN) server. For example, the VPN server may receive, from a VPN client executing on a client device, a first access request for a first software application in a computing environment that is accessible via the VPN server. The first access request can include authentication credentials for the VPN server. The VPN server can authenticate the first access request based on the authentication credentials. In response, a first connection tunnel can be provided between the client device and the first software application. The client device can access the first software application via the first connection tunnel. The VPN server can also deny a second access request received via the first connection tunnel for a second software application in the computing environment.

20 Claims, 3 Drawing Sheets

ZERO TRUST SUPPORT FOR SECURE NETWORKS VIA MODIFIED VIRTUAL PRIVATE NETWORK

TECHNICAL FIELD

The present disclosure relates generally to virtual private networks and, more particularly (although not necessarily exclusively), to implementing zero trust support for secure networks via a modified virtual private network.

BACKGROUND

A Virtual Private Network (VPN) can be used to establish a secure connection between a computing device and a private network. The computing device may be required to authenticate with the VPN, using a VPN client, to access the private network. The VPN client can be a software application running on the computing device that can facilitate communication between the computing device and a VPN server. The VPN can enable the computing device to send and receive data across public networks as if the computing device was directly connected to the private network by rerouting the data through the VPN server. After being rerouted, the data can appear to come from the VPN server rather than the computing device, thereby creating the secure connection. Additionally, the data can be encrypted to further improve the secure connection.

DETAILED DESCRIPTION

Figure 1:
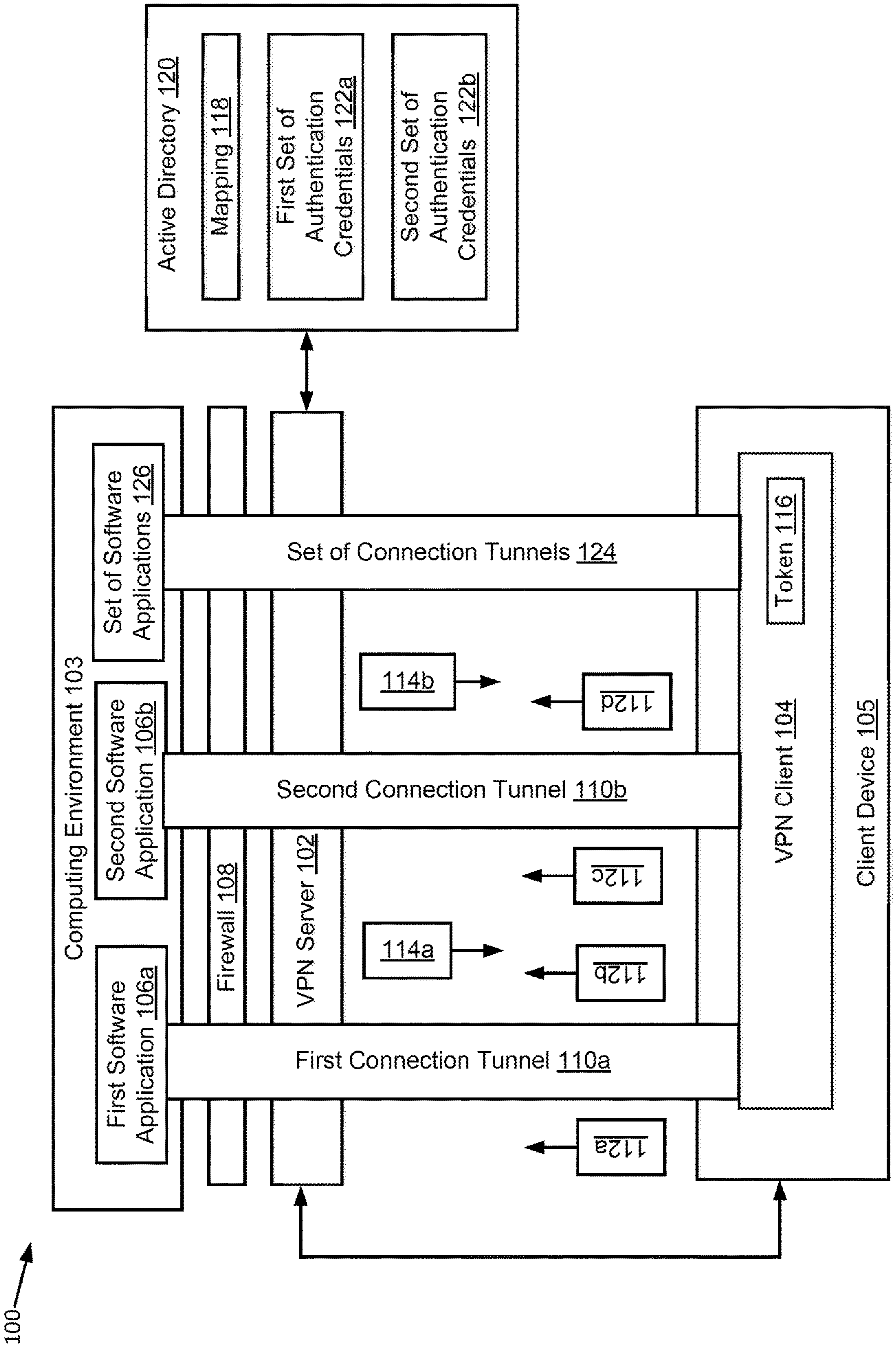
FIG. 1 is a block diagram of an example of a system for implementing zero trust support for secure networks via a modified virtual private network according to one example of the present disclosure.

A virtual private network (VPN) can be used to control client device access to a network. For instance, after the client device has accessed the network via the VPN, connection to the VPN can automatically authorize the client device to access all resources (e.g., software applications) on the network. Therefore, in the case of a security breach of the VPN by a malicious entity, the malicious entity can move laterally within the network (i.e., access all or most of the software applications on the network accessible via the VPN). In contrast, Zero Trust is a framework for securing network architecture in which implicit trust of client devices can be limited. For example, implicit trust can be limited by requiring frequent verification of the client devices before and during a timeframe in which the client devices are accessing software applications. Thus, in the case of a security breach by a malicious entity, implementation of Zero Trust can limit lateral movement of the malicious entity within the network. However, the implementation of Zero Trust may require expensive modification of software applications. The software applications may be limited or prevented from executing normal tasks, such as storing data, while the software applications are being modified. This may increase latency or otherwise negatively impact the functioning of the network. Additionally, modification of the software applications can cause loss or corruption of data. It may also be difficult or impossible to modify certain applications to implement zero trust. For example, legacy applications can be difficult or impossible to modify due to being built on outdated operating systems or outdated hardware platforms. Therefore, there can be a need to improve security for network resources without requiring modification of the resources.

Some examples of the present disclosure can overcome one or more of the abovementioned problems via a modified VPN that can implement zero trust support for a computing environment. For example, the VPN can be controlling access between a client device and a set of software applications operating in the computing environment. A VPN client operating on the client device can provide a connection tunnel for each software application in the set of software applications. The client device can, via each connection tunnel, be permitted to access only a corresponding software application. In this way, zero trust support can be implemented to secure the computing environment. The zero trust support can include the modified VPN providing minimal trust for the client device during access to the computing environment. For example, frequent verification of the client device can be performed by requiring the client device to provide authentication credentials to the VPN server to establish each connection tunnel prior to accessing a software application. Additionally, in the case of a security breach by a malicious entity to one of the connection tunnels, the locked connection tunnels can limit lateral movement of the malicious entity in the computing environment. The malicious entity may only be able to access the single software application connected via its connection tunnel. The VPN server may block the malicious entity from accessing all other software applications in the computing environment. Moreover, modifying the VPN to lock connection tunnels can reduce latency for the computing environment by providing an alternative to performing time consuming and computationally expensive modifications on the set of software applications. The modification of the VPN to improve security can also prevent loss of data, corruption of data, or other undesirable effects of modifying the software applications.

In a particular example, a VPN server can control access to a private network, such as an intranet, on which multiple software applications are executing. The software applications can be protected by a firewall. The VPN server can control access to the private network by allowing or denying access for client devices attempting to pass through the firewall. The client devices may include a VPN client that can communicate with the VPN server. For example, the VPN server may receive a first access request from a VPN client for a database in the private network. The database can be protected by the firewall. The first access request can include a username and password for authenticating the client device. The VPN server can authenticate the first access request by determining that the username and password are valid authorization credentials. In response, the VPN server can allow the VPN client to establish a first connection tunnel between the client device and the database. The first connection tunnel can enable the client device to bypass the firewall and access the database.

The VPN server can further restrict access for the client device to the client device from accessing other software applications via the first connection tunnel. For example, the VPN server may deny a second access request for a second software application, such as a word processing application, transmitted by the VPN client via the first connection tunnel. The VPN sever may further determine that the word processing application requires an additional authentication mechanism that was not required by the database. For example, access to the word processing application can require a one-time password (OTP). The VPN server may determine that the additional authentication mechanism is required based on an active directory. The active directory can contain important information associated with the private network, such as authentication requirements for each of the multiple software applications. Thus, the VPN server can determine that the OTP is required for the word processing application based on the information in the active directory and transmit an authentication request to the VPN client for the OTP.

In response to the authentication request, the VPN client can transmit a third access request to the VPN server that includes the OTP. The VPN server can authenticate the third access request based on the OTP. The VPN server can further authorize the VPN client to establish a second connection tunnel between the client device and the word processing application, through which the client device can access the word processing application. Consequently, in the particular example, the VPN server can provide two connection tunnels to provide separate, secure access to two of the multiple software applications. Each connection tunnel may only provide access to its particular software application. The VPN serve may allow additional connection tunnels to be provided in response subsequent access requests transmitted by the VPN client for the remainder of the multiple software applications.

Illustrative examples are given to introduce the reader to the general subject matter discussed herein and are not intended to limit the scope of the disclosed concepts. The following sections describe various additional features and examples with reference to the drawings in which like numerals indicate like elements, and directional descriptions are used to describe the illustrative aspects, but, like the illustrative aspects, should not be used to limit the present disclosure.

FIG. 1 is a block diagram of an example of a system 100 for implementing zero trust support for secure networks via a modified virtual private network according to one example of the present disclosure. The system 100 may include a computing environment 103 that is protected by a firewall 108 and includes software applications 106*a-b*. A VPN server 102 may control access for a client device 105 to the computing environment 103, thereby controlling access to the software applications 106*a-b*. The VPN server 102 can be communicatively coupled to the client device 105. For example, the VPN server 102 may receive one or more access requests 112*a-d* from the client device 105 via a network, such as a local area network (LAN), wide area network (WAN), the Internet, or any combination thereof. Examples of the client device 105 can include laptop computers, desktop computers, mobile phones, tablets, wearable devices, or other suitable devices. Additionally, a VPN client 104 can be a software application that operates on the client device 105 to facilitate communication between the client device 105 and the VPN server 102.

In an example, the VPN server 102 can receive a first access request 112*a* for a first software application 106*a* from the VPN client 104. The VPN client 104 can transmit the first access request 112*a* on behalf of the client device 105. The first access request 112*a* can include authentication credentials, such as a username and password, for the VPN server 102. The VPN server 102 can authenticate the first access request 112*a* based on the authentication credentials.

For example, the VPN server 102 can be communicatively coupled to or can include an active directory 120. The active directory 120 may include sets of authentication credentials 122*a-b* that can be used to authenticate with the VPN server 102, with connection tunnels 110*a-b*, with the software applications 106*a-b*, or a combination thereof. Therefore, the VPN server 102 may authenticate the first access request 112*a* by accessing the active directory 120. Then, the VPN server 102 may verify that the authentication credentials received from the VPN client 104 in the first access request 112*a* are included in a first set of authentication credentials 122*a*. The first set of authentication credentials 122*a* may be authentication credentials that the client device 105 can use to authenticate with the VPN server 102 for access to the first software application 106*a*.

As a result of the authentication, the VPN server 102 can authorize the VPN client 104 to generate a first connection tunnel 110*a* between the client device 105 and the first software application 106*a*. Alternatively, the VPN server 102 may generate the first connection tunnel 110*a*. The client device 105 can use the first connection tunnel 110*a* to access the first software application 106*a*. For example, the client device 105 can bypass the firewall 108 via the first connection tunnel 110*a* to transmit data packets, requests, or more to the first software application 106*a*.

The VPN server 102 can also restrict access for the client device 105 with respect to the first connection tunnel 110*a*. For example, the VPN server 102 may prevent the client device 105 from accessing other applications 106, such as a second software application 106*b*, via the first connection tunnel 110*a*. Therefore, the VPN server 102 may deny a second access request 112*b* for the second software application 106*b* transmitted by the VPN client 104 on behalf of the client device 105 via the first connection tunnel 110*a*. In another example, the VPN server 102 may deny an access request for the first software application 106*a* if the access request was not transmitted via the first connection tunnel 110*a*.

After denying the second access request 112*b*, the VPN server 102 may determine that access to the second software application 106*b* requires different or additional authentication credentials compared to the first software application 106*a*. For example, the second software application 106*b* may have higher security requirements than the first software application and therefore can require multi-factor authentication (e.g., the username and password and a one-time password (OTP)). In another example, the second software application 106*b* can require different authentication credentials, such as a second username and password that can be specific to the second software application 106*b*.

In some examples, the VPN server 102 may access the active directory 120 to determine which authentication credentials are required for the second software application 106*b*. The VPN server 102 can then transmit an indication of the required authentication credentials to the client device 105. For example, a second set of authentication credentials 122*b* in the active directory 120 may indicate that after access to the VPN server 102 is established, access to the second software application 106*b* can require the second username and password. As a result, the VPN server 102 may transmit a first authentication request 114*a* to the VPN client 104. The first authentication request 114*a* can prompt a user of the client device 105 to transmit another access request with the second username and password via the VPN client 104.

In response, the VPN client 104 can transmit a third access request 112*c* for the second software application 106*b* that includes the second username and password. The VPN server 102 can authenticate the third access request 112*c* based on the second username and password. After authentication, the VPN client 104 can provide a second connection tunnel 110*b* between the client device 105 and the second software application 106*b*. The VPN server 102 can permit the client device 105 to access the second software application 106*b* through the second connection tunnel 110*b*. The VPN server 102 can further restrict access for the client device 105 to other software applications, such as to the first software application 106*a*, from the second connection tunnel 110*b*.

For example, the VPN server 102 may deny a fourth access request 112*d* for the first software application 106*a* received from the VPN client 104 via the second connection tunnel 110*b*. The VPN server 102 may then transmit a second authentication request 114*b* to the VPN client 104 in response to the fourth access request 112*d*. In an example, the second authentication request 114*b* may cause the VPN client 104 to automatically retransmit authentication credentials for the first software application 106*a* included in the fourth access request 112*d* via the first connection tunnel 110*a*. In another example, the second authentication request 114*b* can notify the user of the denial. The second authentication request 114*b* may prompt the user to transmit another access request for the first software application 106*a* to the VPN server 102 via the VPN client 104.

In some examples, the active directory 120 can include a mapping 118 that associates software applications 106 accessible via the VPN server 102 to connection tunnels 110 through which the software applications 106 can be accessed. Each connection tunnel 110 can be associated with one or more of the software applications 106. In an example, the VPN server 102 may provide one connection tunnel for a set of software applications that can be accessed using certain authentication credentials or that have the same or similar security requirements. Additionally, the VPN server 102 can update the active directory 120 when connection tunnels are established or changed. For example, the VPN server 102 can update the active directory 120 to include the first connection tunnel 110*a* by mapping the first software application 106*a* to the first connection tunnel 110*a* and to include the second connection tunnel 110*b* by mapping the second software application 106*b* to the second connection tunnel 110*b*.

Therefore, the active directory 120 can be used to track and manage access to software applications via connection tunnels, and in doing so, can improve the efficiency of the VPN server 102 in providing access for the client device 105 to the computing environment 103. For example, the VPN server 102 may detect that a particular software application is not accessible via a particular connection tunnel based on the mapping 118 provided by the active directory 120. In another example, the VPN server 102 may detect that authentication credentials included in an access request cannot be used to access a particular software application based on the sets of authentication credentials 122*a-b* provided by the active directory 120.

In some examples, the VPN server 102 may generate, based on authentication credentials included an access request, a token 116 for the client device 105. The token 116 can be used by the client device 105 to access a set of connection tunnels 124. The set of connection tunnels 124 may be associated with a set of software applications 126 that each have the same or similar security requirements or authentication requirements. Once the client device 105 has been authorized to access one of the software applications in the set of software applications 126 via one of the set of connection tunnels 124, the VPN server 102 may grant the token 116 to the client device 105. The token 116 can indicate to the VPN server 102 that the client device 105 is authorized to access any of the software applications in the set of software applications 126 using their associated connection tunnel in the set of connection tunnels 124. This can reduce a number of times that the VPN client 104 transmits authentication credentials and establishes connection tunnels 110, which can reduce latency associated with accessing the computing environment 103.

Although FIG. 1 depicts a certain number and arrangement of components, this is for illustrative purposes and intended to be non-limiting. Other examples may include more components, fewer components, different components, or a different arrangement of the components shown in FIG. 1.

Figure 2:
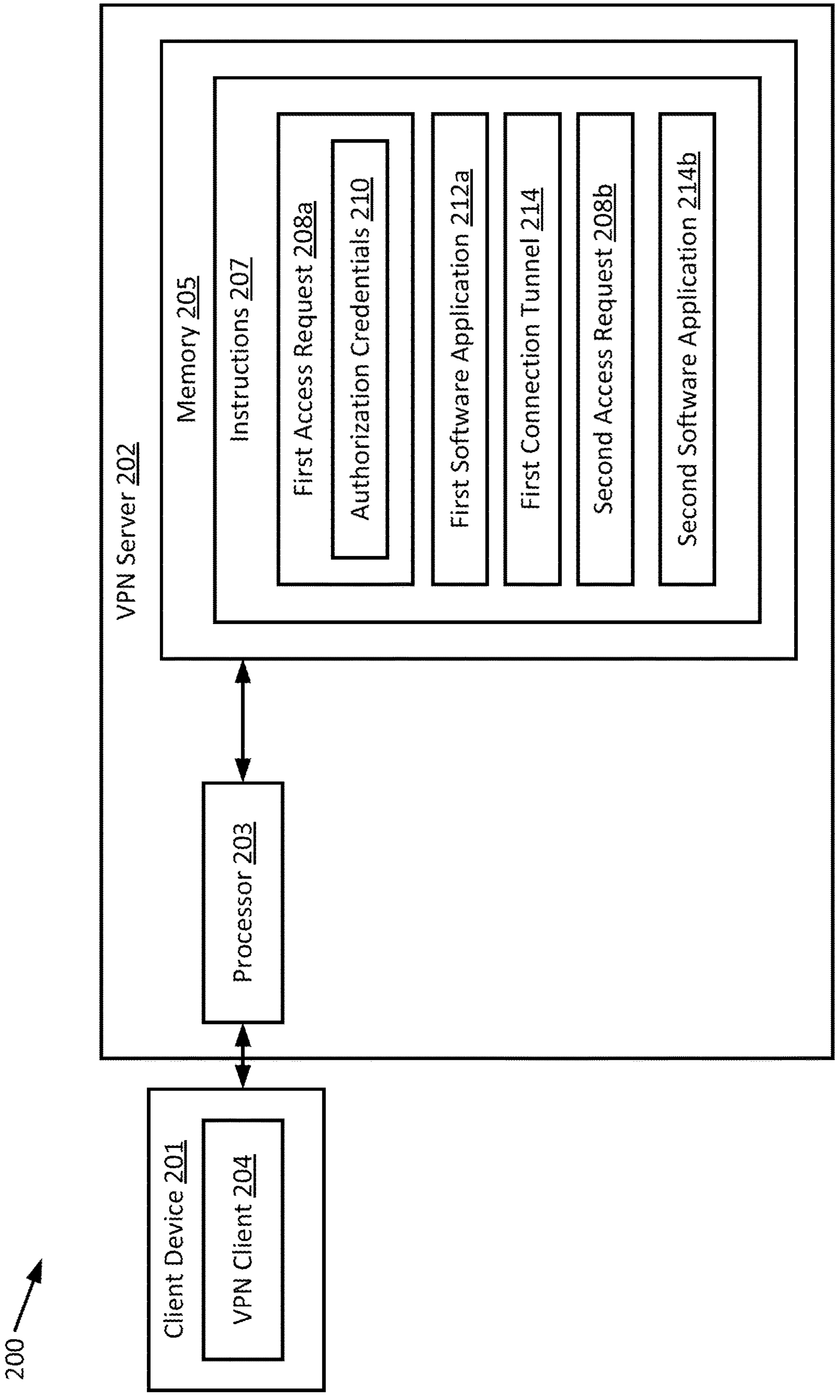
FIG. 2 is a block diagram of an example of a computing device for implementing zero trust support for secure networks via a modified virtual private network according to one example of the present disclosure.

FIG. 2 is a block diagram of a computing device 200 for implementing zero trust support for secure networks via a modified virtual private network (VPN) according to one example of the present disclosure. The computing device 200 can include a processor 203 communicatively coupled to a memory 205.

The processor 203 can include one processor or multiple processors. Non-limiting examples of the processor 203 include a Field-Programmable Gate Array (FPGA), an application-specific integrated circuit (ASIC), and a microprocessor. The processor 203 can execute instructions 207 stored in the memory 205 to perform operations. In some examples, the instructions 207 can include processor-specific instructions generated by a compiler or an interpreter from code written in any suitable computer-programming language, such as C, C++, C#, Java, Python, or any combination of these.

The memory 205 can include one memory device or multiple memory devices. The memory 205 can be non-volatile and may include any type of memory device that retains stored information when powered off. Non-limiting examples of the memory 205 include electrically erasable and programmable read-only memory (EEPROM), flash memory, or any other type of non-volatile memory. At least some of the memory 205 includes a non-transitory computer-readable medium from which the processor 203 can read instructions 207. A computer-readable medium can include electronic, optical, magnetic, or other storage devices capable of providing the processor 203 with the instructions 207 or other program code. Non-limiting examples of a computer-readable medium include magnetic disk(s), memory chip(s), ROM, random-access memory (RAM), an ASIC, a configured processor, and optical storage.

The processor 203 can execute instructions 207 to cause the processor 203 to receive, from a Virtual Private Network (VPN) client 204 executing on a client device 201, a first access request 208*a* for a first software application 212*a* in a computing environment that is accessible via a VPN server 202. The first access request 208*a* can include authentication credentials 210 for the VPN server 202. The processor 203 can further authenticate the first access request 208*a* based on the authentication credentials 210. The processor 203 can provide a first connection tunnel 214 between the client device 201 and the first software application 212*a*. The client device 201 can be configured to access the first software application 212*a* via the first connection tunnel 214. In response to providing the first connection tunnel 214, the processor 203 can further deny a second access request 208*b* for a second software application 212*b* in the computing environment. The second access request 208*b* can be received from the VPN client 204 via the first connection tunnel 214 and the second software application 214*b* can be accessible via the VPN server 202.

Figure 3:
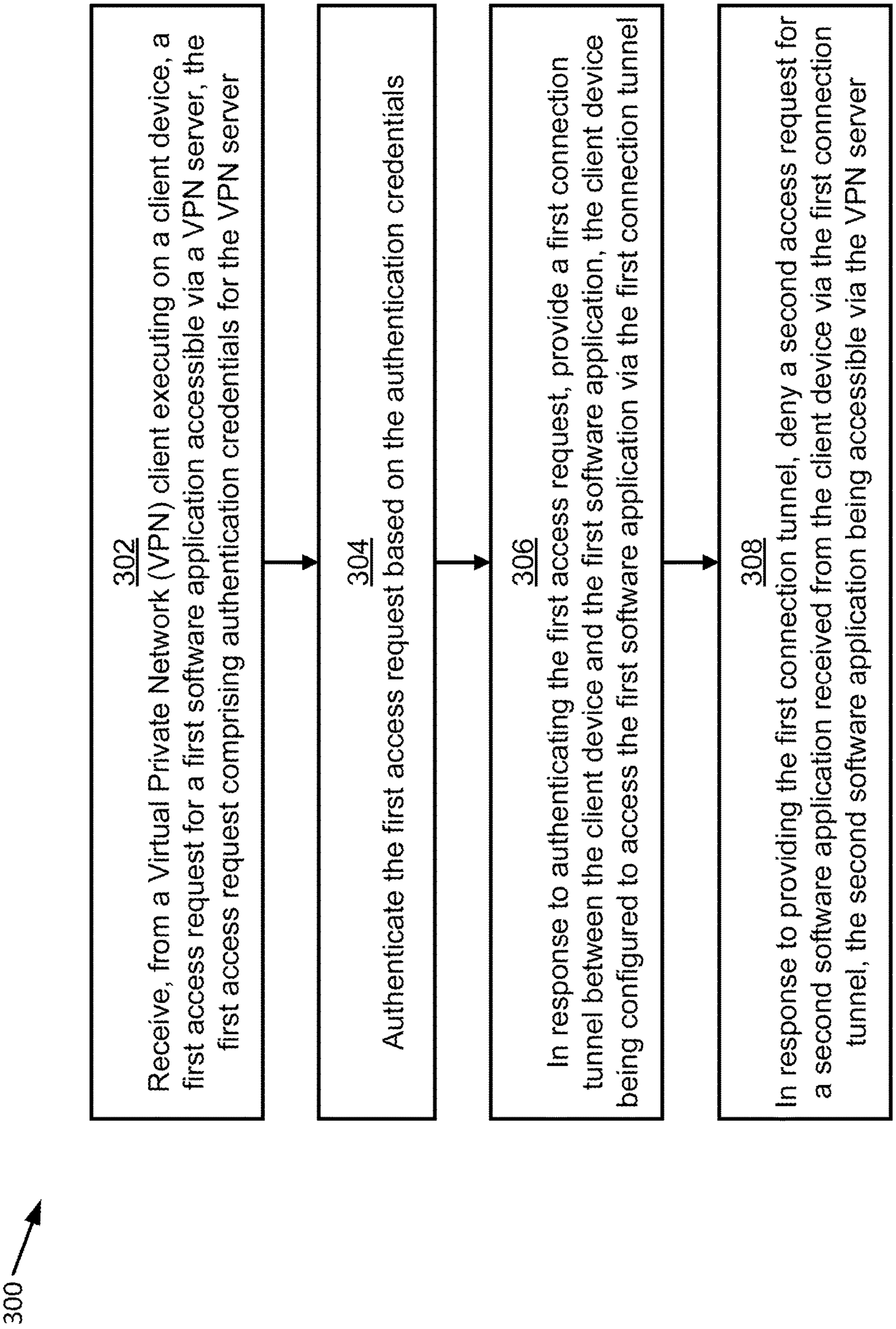
FIG. 3 is a flowchart of an example of a process for implementing zero trust for secure networks via a modified virtual private network according to one example of the present disclosure.

FIG. 3 is a flowchart of a process for implementing zero trust support for secure networks via a modified virtual private network (VPN) according to one example of the present disclosure. In some examples, the processor 203 can implement some or all of the steps shown in FIG. 3. Other examples can include more steps, fewer steps, different steps, or a different order of the steps than is shown in FIG. 3. The steps of FIG. 3 are discussed below with reference to the components discussed above in relation to FIGS. 1-2.

At block 302, the processor 203 can receive, from a VPN client 104 executing on a client device 105, a first access request 112*a* for a first software application 106*a* accessible via a VPN server 102, the first access request 112*a* comprising authentication credentials for the VPN server 102. The first software application 106*a* and a second software application 106*b* can be executing in a computing environment 103. In an example, the first software application 106*a* can be a legacy application and the authentication credentials can include a username and password. The legacy application can be a relatively old software application that was created based on outdated technology. Because the legacy application is outdated, it may be difficult or impossible to modify the legacy application for implementing Zero Trust to secure the computing environment 103. For example, modifying the legacy application may require extensive updates to the computing environment 103, such as updates to an operating system associated with the computing environment 103. Therefore, implementing the zero trust support via modification of the VPN can be a more efficient technique for securing the computing environment 103.

At block 304, the processor 203 can authenticate the first access request 112*a* based on the authentication credentials. To authenticate the first access request 112*a*, the processor 203 may access an active directory 120 that that contains important information associated with the computing environment 103, such as authentication credentials that can be used to access the first software application 106*a*. The processor 203 may verify, based on the active directory 120, that the authentication credentials in the first access request 112*a* can be used for accessing the first software application 106*a*.

At block 306, the processor 203 can, in response to authenticating the first access request 112*a*, provide a first connection tunnel 110*a* between the client device 105 and the first software application 106*a*. The client device 105 can then access the first software application 106*a* via the first connection tunnel 110*a*. The processor 203 can also restrict access such that the first connection tunnel 110*a* may only be used to access the first software application 106*a*. Therefore, a second software application 106*b*, which can be a second legacy application included in the computing environment 103, may not be accessible using the first connection tunnel 110*a*. Additionally, by providing the first connection tunnel 110*a* and restricting access, security of the first software application 106*a* can be improved by modifying the VPN rather than modifying the first software application 106*a*.

Additionally, after verification of the authentication credentials and upon providing the first connection tunnel 110*a*, the processor 203 may generate a token 116. The token 116 can be used to access a set of connection tunnels 124 that may include the first connection tunnel 110*a* and a third connection tunnel. The third connection tunnel can be associated with a third software application that has the same or similar authentication requirements as the first software application 106*a*.

At block 308, the processor 203 can, in response to providing the first connection tunnel 110*a*, deny a second access request 112*b* for a second software application 106*b* received from the client device 105 via the first connection tunnel 110*a*, the second software application 106*b* being accessible via the VPN server 102. The second access request 112*b* can include the token 116. The second access request 112*b* can be denied because the second software application 106*b* is not associated with the first or third connection tunnels. The second access request 112*b* can also be denied because of the restriction of the first connection tunnel 110*a* that prevents the client device 105 from accessing the second software application 106*b* from the first connection tunnel 110*a*.

The processor 203 may further determine that access to the second software application 106*b* requires additional authentication compared to the first software application 106*a*. For example, the second software application 106*b* may require an OTP in addition to the username and password. As a result, the processor 203 can transmit a first authentication request 114*a* to the VPN client 104 for the OTP. Then, the VPN client 104 can transmit a third access request 112*c* for the second software application 106*b* that includes the OTP. The processor 203 can authenticate the third access request 112*c* based on the OTP. After authentication, the processor 203 can provide a second connection tunnel 110*b* between the client device 105 and the second software application 106*b* through which the client device 105 can access the second software application 106*b*. Moreover, in response to providing the second connection tunnel 110*b*, the processor 203 may deny a fourth access request 112*d* for the first software application 106*a* received from the VPN client 104 via the second connection tunnel 110*b*.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A Virtual Private Network (VPN) server comprising:
a processor; and
a memory device that includes instructions executable by the processor for causing the processor to perform operations comprising:
receiving, from a VPN client executing on a client device, a first access request for a first software application in a computing environment that is accessible via the VPN server, the first access request comprising authentication credentials for the VPN server;
authenticating the first access request based on the authentication credentials;
in response to authenticating the first access request, providing a first VPN connection tunnel between the client device and the first software application, the client device being configured to access the first software application via the first VPN connection tunnel; and after providing the first VPN connection tunnel;

receiving a second access request for the client device to access a second software application in the computing environment via the first VPN connection tunnel, the second access request being received via the first VPN connection tunnel from the VPN client executing on the client device, the second software application being accessible via the VPN server; and in response to receiving the second access request, denying the second access request for the client device to access the second software application via the first VPN connection tunnel based on a predefined security policy that limits the first VPN connection tunnel against providing access to the second software application.

2. The VPN server of claim 1, wherein the operation of providing the first VPN connection tunnel between the client device and the first software application further comprises:

authorizing the VPN client to establish the first VPN connection tunnel; and restricting access for the VPN client to prevent the client device from accessing the second software application via the first VPN connection tunnel.

3. The VPN server of claim 1, wherein the memory device further includes instructions executable by the processor for causing the processor to perform operations comprising:

updating an active directory to include the first VPN connection tunnel by mapping the first software application to the first VPN connection tunnel.

4. The VPN server of claim 3, wherein the active directory further includes a set of authentication credentials required to authenticate the client device to the VPN server for the first VPN connection tunnel, and wherein the operation of authenticating, based on the authentication credentials, the first access request further comprises:

accessing the active directory; and verifying, based on the set of authentication credentials in the active directory, that the authentication credentials received from the VPN client are included in the set of authentication credentials required to authenticate the client device for the first VPN connection tunnel.

5. The VPN server of claim 1, wherein the operation of denying the second access request for the second software application received from the client device via the first VPN connection tunnel further comprises:

determining that access to the second software application via the VPN server requires additional authentication compared to the first software application; and in response to determining that access to the second software application requires additional authentication, transmitting an authentication request to the VPN client for additional authentication credentials.

6. The VPN server of claim 5, wherein the memory device further includes instructions executable by the processor for causing the processor to perform operations comprising, subsequent to transmitting the authentication request to the VPN client for additional authentication credentials:

receiving, from the VPN client, a third access request for the second software application, the third access request comprising the additional authentication credentials;

authenticating the third access request based on the additional authentication credentials; and providing a second VPN connection tunnel between the client device and the second software application, the client device being configured to access the second software application via the second VPN connection tunnel.

7. The VPN server of claim 6, further comprising:

after providing the second VPN connection tunnel:

receiving, via the second VPN connection tunnel, a fourth access request from the VPN client for the first software application; and in response to receiving the fourth access request, denying the fourth access request based on the second VPN connection tunnel being secured against providing access to the first software application.

8. The VPN server of claim 1, wherein the memory device further includes instructions executable by the processor for causing the processor to perform operations comprising:

generating, based on the authentication credentials in the first access request, a token for the client device, the token usable by the client device to access a set of connection tunnels; and providing access, for the client device, to a set of software applications associated with the set of connection tunnels based on the token.

9. The VPN server of claim 1, wherein the predefined security policy restricts the first VPN connection tunnel against providing the client device with access to other software applications in the computing environment, the other software applications being different than the first software application.

10. A method comprising:

receiving, by a Virtual Private Network (VPN) server, a first access request from a VPN client executing on a client device, the first access request being for a first software application in a computing environment that is accessible via the VPN server, the first access request comprising authentication credentials for the VPN server;

authenticating, by the VPN server, the first access request based on the authentication credentials;

in response to authenticating the first access request, providing, by the VPN server, a first VPN connection tunnel between the client device and the first software application, the client device being configured to access the first software application via the first VPN connection tunnel; and after providing the first VPN connection tunnel:

receiving, by the VPN server, a second access request for the client device to access a second software application in the computing environment via the first VPN connection tunnel, the second access request being received via the first VPN connection tunnel from the VPN client executing on the client device, the second software application being accessible via the VPN server; and in response to receiving the second access request, denying, by the VPN server, the second access request for the client device to access the second software application via the first VPN connection tunnel based on a predefined security policy that limits the first VPN connection tunnel against providing access to the second software application, wherein the predefined security policy locks the first VPN connection tunnel to provide access to only a single software application that is the first software application.

11. The method of claim 10, wherein providing the first VPN connection tunnel between the client device and the first software application further comprises:

authorizing the VPN client to establish the first VPN connection tunnel; and restricting access for the VPN client to prevent the client device from accessing the second software application via the first VPN connection tunnel.

12. The method of claim 10, further comprising:

updating an active directory to include the first VPN connection tunnel by mapping the first software application to the first VPN connection tunnel.

13. The method of claim 12, wherein the active directory further includes a set of authentication credentials required to authenticate the client device to the VPN server for the first VPN connection tunnel, and wherein authenticating, based on the authentication credentials, the first access request further comprises:

accessing the active directory; and verifying, based on the set of authentication credentials in the active directory, that the authentication credentials received from the VPN client are included in the set of authentication credentials required to authenticate the client device for the first VPN connection tunnel.

14. The method of claim 10, wherein denying the second access request for the second software application received from the client device via the first VPN connection tunnel further comprises:

determining that access to the second software application via the VPN server requires additional authentication compared to the first software application; and in response to determining that access to the second software application requires additional authentication, transmitting an authentication request to the VPN client for additional authentication credentials.

15. The method of claim 14, wherein, subsequent to transmitting the authentication request to the VPN client for additional authentication credentials, the method further comprises:

receiving, from the VPN client, a third access request for the second software application, the third access request comprising the additional authentication credentials;

authenticating the third access request based on the additional authentication credentials; and providing a second VPN connection tunnel between the client device and the second software application, the client device being configured to access the second software application via the second VPN connection tunnel, the second VPN connection tunnel being locked to provide access only to a single software application that is the second software application.

16. The method of claim 15, further comprising:

after providing the second VPN connection tunnel:

receiving, by the VPN server via the second VPN connection tunnel, a fourth access request from the VPN client for the first software application; and in response to receiving the fourth access request, denying, by the VPN server, the fourth access request based on the second VPN connection tunnel being secured against providing access to the first software application.

17. A non-transitory computer-readable medium comprising instructions that are executable by a processor for causing the processor to perform operations comprising:

receiving, from a Virtual Private Network (VPN) client executing on a client device, a first access request for a first software application in a computing environment that is accessible via a VPN server, the first access request comprising authentication credentials for the VPN server;

authenticating the first access request based on the authentication credentials;

in response to authenticating the first access request, providing a first VPN connection tunnel between the client device and the first software application, the client device being configured to access the first software application via the first VPN connection tunnel; and after providing the first VPN connection tunnel:

receiving a second access request for the client device to access a second software application in the computing environment via the first VPN connection tunnel, the second access request being received via the first VPN connection tunnel from the VPN client executing on the client device, the second software application being accessible via the VPN server; and in response to receiving the second access request, denying the second access request for the client device to access the second software application via the first VPN connection tunnel based on a predefined security policy that limits the first VPN connection tunnel against providing access to the second software application, wherein the predefined security policy restricts the first VPN connection tunnel against providing the client device with access to other software applications in the computing environment, the other software applications being different than the first software application.

18. The non-transitory computer-readable medium of claim 17, wherein the operation of providing the first VPN connection tunnel between the client device and the first software application further comprises:

authorizing the VPN client to establish the first VPN connection tunnel; and restricting access for the VPN client to prevent the client device from accessing the second software application via the first VPN connection tunnel.

19. The non-transitory computer-readable medium of claim 17, further comprising instructions executable by the processor for causing the processor to perform operations comprising:

updating an active directory to include the first VPN connection tunnel by mapping the first software application to the first VPN connection tunnel.

20. The non-transitory computer-readable medium of claim 19, wherein the active directory further includes a set of authentication credentials required to authenticate the client device to the VPN server for the first VPN connection tunnel, and wherein the operation of authenticating, based on the authentication credentials, the first access request further comprises:

accessing the active directory; and verifying, based on the set of authentication credentials in the active directory, that the authentication credentials received from the VPN client are included in the set of authentication credentials required to authenticate the client device for the first VPN connection tunnel.

* * * * *